United States Patent Office 3,793,290
Patented Feb. 19, 1974

3,793,290

STABILIZED POLYMERIC COMPOSITION

James S. Dix, Greenville, and Ronald D. Mathis, Mauldin, S.C., assignors to Phillips Petroleum Company No Drawing. Filed Aug. 31, 1971, Ser. No. 176,697
Int. Cl. C08f 45/58, 45/62
U.S. Cl. 260—45.75 N 9 Claims

ABSTRACT OF THE DISCLOSURE

A stabilized polymeric composition comprising a normally solid polymer of a mono-1-olefin having incorporated therein certain nickel amine complexes, an antioxidant, an organic phosphite, a metal salt of a monocarboxylic fatty acid, and a trialkyl substituted hindered phenol.

This invention relates to a stabilized polymeric composition.

Polymers of mono-1-olefins, e.g., polyethylene, polypropylene, and the like, have physical and chemical properties which make them highly desirable for conversion into filaments and other shaped structures. Said polymers can be extruded into filaments of large diameter such as are useful for conversion into bristles, ropes, automobile seat covers, lawn furniture covers, and the like, and also into filaments of a smaller diameter such as are useful for conversion into yarns for the production of textile fabrics. Fabrics produced from such filaments are essentially shrink proof and unaffected by water, completely resistant to moths, and immune to mold. Such fabrics are extremely durable because of the high tenacity and abrasion resistance of the fibers or filaments therein. The heat insulating value of such fabrics is excellent.

It is known that polymers of mono-1-olefins undergo degradation on exposure to actinic radiation. This results in a consequent loss of several of their desirable physical and chemical properties. Polypropylene is particularly susceptible to such degradation. It is also known that such polymers are commonly subjected to elevated temperatures in the course of their processing into useful articles of commerce. Processing methods such as thermoforming, injection molding, extrusion, and the like, at elevated temperatures can result in oxidative degradation of the polymer. Additionally, some use of the poly-1-olefins, for example in electrical insulation and the like, often exposes the poly-1-olefin to elevated temperatures.

To overcome the above described problems in connection with the processing of said polymers into useful articles of commerce, and the subsequent use of such articles, various stabilizing agents comprising ultraviolet absorbers, antioxidants, processing aids, etc., have been proposed in the prior art for incorporation into the polymer.

The present invention provides new and improved stabilized polymeric compositions. Broadly speaking, these stabilized polymeric compositions of the invention comprise a polymer of a mono-1-olefin having incorporated therein a combination of stabilizing agents. Said combination of stabilizing agents has been found to be particularly effective for stabilizing and/or protecting said polymers, and structures made therefrom, from various deteriorative actions caused by the environment or processing steps.

Thus, according to this invention, there is provided a stabilized polymeric composition of matter comprising: (a) a major amount of a polymer of a mono-1-olefin; (b) a small but effective amount of a thiobis-phenol nickel amine complex sufficient to stabilize said composition against the deteriorative action of ultraviolet light; (c) a small but effective amount of an antioxidant sufficient to stabilize said composition against oxidative deteriorative action; (d) a small but effective amount of an organic phosphite sufficient to aid in stabilizing said composition against color degradation upon subsequent extrusion thereof; (e) a small but effective amount of a polyvalent Group II metal salt of an organic monocarboxylic acid sufficient to aid in stabilizing said composition against color degradation and/or serve as a processing aid in processing said composition; and (f) a small but effective amount of a trialkyl substituted hindered phenol sufficient to stabilize said composition against the deteriorative action of heat and provide color stabilization during processing of said composition.

Component (a), the polymer of a mono-1-olefin, can be a normally solid polymer of said olefin, including homopolymers and copolymers, and particularly those 1-olefins wherein the monomer contains from 2 to 8 carbon atoms per molecule. Particularly suitable polymers for use in the practice of the invention are those which are prepared by polymerizing at least one mono-1-olefin containing at least three carbon atoms, preferably not more than six carbon atoms. Examples of suitable monomers include ethylene, propylene, 1-butene, 1-pentene, 3-methyl-1-butene, 1-hexene, 4-methyl-1-pentene, and the like. The expressions "polymer" or "polymers" employed herein and in the claims, unless otherwise specified, refer to both homopolymers and also copolymers of said olefins with each other. Although the invention is not so limited, the discussion herein will be simplified by referring principally to polypropylene. Said polymers can be prepared by any suitable methods known to the art.

Component (b), the nickel amine complexes which can be used in the practice of the invention are the nickel amine complexes of 2,2′-thiobis-4-alkylphenols. Said complexes are not mixtures of amine and nickel thiobisphenols, but are discrete nickel amine complexes having amine and nickel thiobis-phenol components in a fixed ratio of 1:1. They may conveniently be prepared by heating a nickel complex of 2,2′-thiobis(p-alkylphenol) wherein the alkyl radical can be a cyclic or an open chain moiety, preferably as the 1:1 aquo complex, with the amine in an inert volatile, organic solvent, preferably a non-polar solvent such as benzene, chloroform, ether, and acetone. By removal of the solvent, the substantially pure solid amine complex is obtained. The 2,2′-thiobis-p-alkylphenols are well known compounds, and may easily be prepared by known means such as reaction of a p-alkylphenol with $SCl_2$.

The 1:1 aquo complexes are prepared by reacting a nickel salt with a 2,2′-thiobis-p-alkylphenol in an aqueous alcoholic medium in the presence of an acid binder such as sodium acetate.

Examples of useful 4-alkylphenol sulfides are:

bis(p-octylphenol)sulfide,
bis(p-butylphenol)sulfide,
bis(p-cyclohexylphenol)sulfide,
bis(p-nonylphenol)sulfide,
bis(p-ethylphenol)sulfide,
bis(p-amylphenol)sulfide,
bis(p-t-dodecylphenol)sulfide, and
bis(p-octadecylphenol)sulfide.

Examples of amines which can be used to form the amine complexes are: ammonia, primary aliphatic amines such as methylamine, ethylamine, propylamine, laurylamine, butylamine, amylamine, octylamine and octadecylamine; primary aromatic amines such as aniline, anisidine, toluidine, 1-naphthylamine, 2-naphthylamine, p-dodecylaniline, p-butylaniline, xylidene and p-octyloxyaniline; hydroxy amines such as triethanolamine and cyclohexyldiethanolamine; and cyclic secondary amines such as morpholine, hexamethyleneimine, piperazine, and piperidine. Further details regarding the preparation of said nickel amine complexes can be found in U.S. Pat. 3,313,770 issued Apr. 11, 1967, in the name of H. M. Foster.

Examples of said nickel amine complexes which can be used in the practice of the invention include, among others, the following:

[2,2'-thiobis(4-t-octylphenolato)]-n-butylamine-Nickel II
[2,2'-thiobis(4-t-octylphenolato)]-n-dodecylamine-Nickel II
[2,2'-thiobis(4-n-octadecylphenolato)]morpholine-Nickel II
[2,2'-thiobis(4-cyclohexylphenolato)]-1-naphthylamine-Nickel II
[2,2'-thiobis(4-t-butylphenolato)]-hexamethyleneimine-Nickel II
[2,2'-thiobis(4-ethylphenolato)]-n-octylamine-Nickel II
[2.2'-thiobis(4-t-octylphenolato)]-triethylanolamine-Nickel II
[2,2'-thiobis(4-t-octylphenolato)]-cyclohexyldiethanol-amine-Nickel II The above first-named complex is a presently preferred UV agent for use in the practice of the invention.

Said nickel amine complexes can be used in a small but effective amount which is sufficient to impart to the polymer the desired degree of stabilization against the deteriorative action of ultraviolet light. As a general guide to those skilled in the art, but not necessarily by way of limitation, said nickel amine complexes can be used in amounts of from about 0.5 to about 3 parts by weight per hundred parts by weight of the polymer to be stabilized. In some instances it may be preferred to use an amount within the range of from about 0.7 to about 2 parts by weight per 100 parts by weight of polymer.

Component (c), an antioxidant, can, generally speaking, be any suitable antioxidant known to the art to be effective for stabilizing polymers of mono-1-olefins against oxidative deteriorative action. The known compound octadecyl 3-(3,5-di-t-butyl-4-hydroxyphenyl)propionate is a presently preferred antioxidant. Generally speaking, the similar phenolic propionates form a preferred group of antioxidants for use as Component (c). Examples of this preferred group include, among others the following:

octadecyl 3-(3,5-di-t-butyl-4-hydroxyphenyl)propionate
1,2-bis[3-(3,5-di-t-butyl-4-hydroxyphenyl)propionate] ethane
n-butylimino N,N-bis[ethylene 3-(3,5-di-t-butyl-4-hydroxyphenyl)propionate]
tetrakis[methylene 3-(3,5-di-t-butyl-4-hydroxyphenyl) propionate] methane
1,1,1-tris[methylene 3-(3,5-di-t-butyl-4-hydroxyphenyl) propionate] ethane However, as mentioned, other antioxidants can be used as component (c) in the practice of the invention. Examples of other said antioxidants include, among others, the following:

n-octadecyl (3,5-di-t-butyl-4-hydroxyphenyl)acetate
di-n-octadecyl (3,5-di-t-butyl-4-hydroxybenzyl) phosphonate
1,3,5-trimethyl-2,4,6-tris(3,5-di-t-butyl-4-hydroxybenzyl)benzene
2,2'-methylenebis(4-methyl-6-t-butylphenol)
2,2'-methylenebis(6-t-butylphenol)
2,2'-ethylidenebis(4-t-butyl-6-t-octylphenol)
4,4'-methylenebis(3-methyl-6-t-butylphenol)
4,4'-methylenebis(2-methyl-6-t-butylphenol)

Said Component (c) antioxidant can be used in any small but effective amount in which is sufficient to stabilize said composition against oxidative deteriorative action. As a general guide to those skilled in the art, but not necessarily by way of limitation, said Component (c) antioxidants can be used in amounts of from about 0.008 to about 0.15 part by weight per 100 parts by weight of said polymer. In some instances it may be preferred to use an amount within the range of from about 0.01 to about 0.07 part by weight per 100 parts by weight of said polymer.

Component (d), the organic phosphites used in the practice of the invention, can be any suitable organic phosphite which has color stabilizing properties or which will aid in stabilizing the compositions of the invention against color degradation (such as during subsequent extrusion thereof or other processing) when used in combination with other additives in said compositions, and particularly when used with the above-described nickel amine complexes. As set forth hereinafter, we have discovered there is a definite relationship between the amount of said nickel amine complexes and the amount of organic phosphite used, which relationship must be observed if the best results are to be obtained.

Particularly suitable phosphites for use in the practice of the invention include, among others: di- or trioctyl phosphite; diethyl phosphite; dibutyl phosphite; diphenyl phosphite; di- or tridecyl phosphite; phenyldidecyl phosphite, phenyldi(hexadecyl) phosphite, phenyldi(nonadecyl) phosphite, diphenyldecyl phosphite. Of these, dioctyl phosphite is presently preferred.

The amount of said organic phosphites used in the practice of the invention will be a small but effective amount sufficient to aid in stabilizing said composition against color degradation, and will depend upon the amount of said nickel amine complex Component (b) used. For the best results, the amount of organic phosphite used must be an amount within the range of from 0.02 to 0.09 part by weight per each part by weight of said Component (b). In some instances it will be preferred to use an amount within the range of from about 0.04 to 0.08 part by weight per each part of said Component (b).

Component (e) can be at least one monocarboxylic fatty acid salt of the metals of Group II having from 12 to 24, preferably 16 to 22, carbon atoms per molecule, inclusive. Preferred metals are Ca, Mg, Ba, Sr, and Zn. Examples of fatty acids which can be used in the form of their metal salts include, among others, the following: lauric acid, myristic acid, palmitic acid, stearic acid, behenic acid, and the like, including mixtures thereof. Calcium stearate is a presently preferred metal salt of a monocarboxylic acid for use in the practice of the invention.

Said metal salts of monocarboxylic fatty acids can be used in any small but effective amounts sufficient to aid in stabilizing said polymeric composition against color degradation (especially pellet color), and serve as a processing aid. As a general guide to those skilled in the art, but not necessarily by way of limitation, said metal salts of monocarboxylic fatty acids can be used in an amount within the range of from about 0.03 to 0.4 part by weight per 100 parts by weight of the polymer to be stabilized. In some instances it may be preferred to use an amount within the range of from about 0.07 to about 0.15 part by weight per 100 parts by weight of said polymer.

Component (f) can be any suitable trialkyl substituted hindered phenol type of stabilizer. The compound 2,6-di-t-butyl-p-cresol is a presently preferred stabilizer for use as said Component (f). Examples of other such stabilizers which can be used in the practice of the invention include, among others, the following:

2,6-di-cyclohexyl-p-cresol
2,6-di-t-amyl-p-cresol
2,6-diisopropyl-4-ethylphenol
2,6-di-cyclohexyl-4-n-octylphenol
2,6-di-t-octyl-4-n-propylphenol
2-isopropyl-4-methyl-6-t-butylphenol
2-t-butyl-4-ethyl-6-t-octylphenol
2-isobutyl-4-ethyl-6-t-hexylphenol
2-cyclohexyl-4-n-butyl-6-isopropylphenol Said trialkyl substituted hindered phenol type stabilizers can be used in small but effective amounts sufficient to stabilize said polymeric composition against the deteriorative action of heat during processing steps and also to serve as a color stabilizer during said processing steps, for example, during extrusion operations, including melt spinning operations. It was unexpected to find that hindered phenols of the 2,4,6 trialkyl substituted phenol type, such as 2,6-di-t-butyl-p-cresol, are remarkably effective in maintaining uniformity of fiber color under different spinning conditions. The amount of said trialkyl substituted hindered phenol type stabilizer used will depend upon the amount of said Component (b) used. For the best results the amount used should be an amount within the range of from 0.01 to 0.31 part by weight per each part by weight of said Component (b). In some instances it will be preferred to use an amount within the range of from about 0.02 to about 0.13 part by weight per each part of said Component (b).

The above described Components (b) to (f) can be incorporated in said polymer in any suitable manner known to the art. For example, said additive components can be mixed with the polymer separately (individually) or in combination as a separate mixture from the polymer using any conventional manner known in the art. It is desired that said addiitve components will be intimately dispersed in the polymer. Suitable mixing procedures include dry mixing the various components with the polymer, making solutions of one or more of said additive components and blending the resulting solutions with the polymer, melt blending the various components individually or in combination with melted polymer at temperatures that are not significantly deleterious to the polymer or the various components, and the like.

One presently preferred composition in accordance with the invention comprises:

| | Parts by weight |
|---|---|
| Component (a) | 100 |
| Component (b) about | 1.6 |
| Component (c) about | 0.02 |
| Component (d) about | 0.1 |
| Component (e) about | 0.1 |
| Component (f) about | 0.05 |

Wherein: Component (a) is polypropylene; Component (b) is [2,2'-thiobis(4-t-octylphenolato)]-n-butylamine Nickel II; Component (c) is octadecyl 3-(3,5-di-t-butyl-4-hydroxyphenyl)propionate; Component (d) is dioctyl phosphite; Component (e) is calcium stearate; and Component (f) is 2,6-di-t-butyl-p-cresol.

The stabilized polymeric compositions of the invention can contain additional suitable additives so long as said additional additives are compatible with the polymer and so long as the improved results of this invention are unaffected. For example, additional conventional stabilizers against thermal, ultraviolet, or other degrading effects can be used as well as fillers, coloring pigments, foaming agents, and the like.

The following examples will serve to further illustrate the invention.

EXAMPLE I

A series of runs was made in which polymer compositions were prepared using a polypropylene having a melt flow about 12 (ASTM D1238-62T, Condition L). The additives were mixed with the polypropylene (powder) utilizing a Henschel blender. The resulting mixtures were then further homogenized in the molten state by passing each through a heated extruder. The extrudates, which had a temperature in the range of about 400° to 430° F., were water quenched and the pelletized. Fibers were melt spun from each pelletized blend at 500° F. and 550° F. in conventional manner to give an 8-strand multifilament yarn of about 90 denier per filament, undrawn. The recipe was as follows:

| | |
|---|---|
| Polypropylene | 100 parts by wt. |
| Component [b] | 1.6 parts by wt. |
| Component [c] | 0.02 part by wt. |
| Component [d] | See Table I below. |
| Component [e] | 0.1 part by wt. |
| Component [f] | 0.05 part by wt. |

[b] [2,2'-thiobis(4-t-octylphenolato)]-n-butylamine Nickel II.
[c] Octadecyl 3-(3,5-di-t-butyl-4-hydroxyphenyl)propionate.
[d] Dioctyl phosphite.
[e] Calcium stearate.
[f] 2,6-di-t-butyl-p-cresol.

The results are set forth in Table I below.

TABLE I

| | Dioctyl phosphite, parts/100 parts polymer | Spin temp., ° F. | Fiber color |
|---|---|---|---|
| Run number: | | | |
| 1 [1] | 0.06 | 500 | Light green. |
| 2 [1] | 0.09 | 500 | Yellow green. |
| 3 [1] | 0.1 | 500 | Do. |
| 4 | 0.12 | 500 | Do. |
| 5 | 0.15 | 500 | Do. |
| 6 [1] | 0.06 | 550 | Tan. |
| 7 [1] | 0.09 | 550 | Yellow tan. |
| 8 [1] | 0.1 | 550 | Greenish yellow. |
| 9 | 0.12 | 550 | Yellow. |
| 10 | 0.15 | 550 | Grayish green. |
| 11 | 0.17 | 550 | Gray yellow green. |
| 12 | 0.20 | 550 | Gray. |

[1] Contained 0.05 part by weight of calcium stearate per 100 parts by weight of polymer.

The above data show the advantages of controlling the Compound (d) concentration. Said concentration should preferably be greater than 0.06 but less than 0.15 part by weight per 100 parts by weight of polymer in order to minimize fiber color variation with variations in spinning temperatures. The above preferred range, stated in terms of Component (b), would be greater than 0.03 but less than 0.09 part by weight per part of Component (b).

Example II

Another series of runs was made in substantially the same manner as in Example I. The recipe used was as follows:

| | |
|---|---|
| Polypropylene | 100 parts by weight. |
| Component (b) | 1.6 parts by weight. |
| Component (c) | 0.02 part by weight. |
| Component (d) | See Table II. |
| Component (e) | 0.05 part of weight. |
| Component (f) | See Table II. |

The results are set forth in Table II below.

TABLE II

| Run number | Component (d) | Component (f) | Spin temp., ° F. | Fiber color |
|---|---|---|---|---|
| 1 | 0.05 | 0.05 | 500 | Light green. |
| 2 | 0.07 | 0.0 | 500 | Do. |
| 3 | 0.09 | 0.05 | 500 | Yellow green. |
| 4 | 0.1 | 0.2 | 500 | Do. |
| 5 | 0.05 | 0.05 | 550 | Tan. |
| 6 | 0.07 | 0.0 | 550 | Yellow tan. |
| 7 | 0.09 | 0.05 | 550 | Do. |
| 8 | 0.1 | 0.2 | 550 | Yellow green. |

The above data show the advantages of using Component (f) in the polymer composition. There was less fiber color variation with variation in spinning temperature. The above data also show the advantage of using an increased concentration level of Component (d).

The data in the above Tables I and II illustrate the real and effective cooperation which is obtained when the five additive agents (b), (c), (d), (e), and (f) are used in stabilizing polymers of mono-1-olefins in accordance with the invention. As set forth herein, there is a particularly real and effective cooperation in the use of Component (d) in amounts which depend upon the amount of Component (b) used, as specified herein. There is also a particularly real and effective cooperation in the use of Component (f) in amounts which depend upon the amount of Component (b) used, as specified herein.

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:

1. A stabilized polymeric composition of matter comprising:

(a) a major amount of a polymer of a mono-1-olefin;

(b) a small but effective amount within the range of from about 0.5 to about 3 parts by weight per 100 parts by weight of said polymer, and which is sufficient to stabilize said composition against the deteriorative action of ultraviolet light, of at least one nickel amine complex of 2,2′-thiobis(p-alkylphenol) wherein: the complex-forming amine is a member selected from the group consisting of ammonia, primary aliphatic amines, primary aromatic amines, hydroxy amines, and cyclic secondary amines; said alkyl group contains up to 18 carbon atoms; and said complex is characterized by a single nickel-to-nitrogen coordinate bond and a single nickel-to-sulfur coordinate bond for each nickel atom in the complex molecule;

(c) a small but effective amount within the range of from about 0.008 to about 0.15 part by weight per 100 parts by weight of said polymer, and which is sufficient to stabilize said composition against oxidative deteriorative action, of an antioxidant selected from the group consisting of octadecyl 3-(3,5-di-t-butyl-4-hydroxyphenyl)propionate; 1,2 - bis[3-(3,5-di-t-butyl - 4 - hydroxyphenyl)propionate] ethane; n-butylimino N,N-bis[ethylene 3-(3,5-di-t-butyl - 4-hydroxyphenyl)propionate]; tetrakis[methylene 3 - (3, 5-di-t-butyl-4 - hydroxyphenyl)propionate] methane; 1,1,1-tris[methylene 3-(3,5-di-t-butyl - 4 - hydroxyphenyl)propionate] ethane; n-octadecyl (3,5 - di-t-butyl - 4-hydroxyphenyl)acetate; di-n-octadecyl (3,5-di-t-butyl-4-hydroxybenzyl)phosphonate; 1,3,5 - trimethyl-2,4,6 - tris(3,5 - di - t-butyl-4-hydroxybenzyl) benzene; 2,2′-methylenebis(4 - methyl - 6 - t - butylphenol); 2,2′-methylenebis(6 - t-butylphenol); 2,2′-ethylidenebis(4-t-butyl-6-t-octylphenol); 4,4′-methylenebis(3-methyl-6-t-butylphenol); 4,4′ - methylenebis (2-methyl-6-t-butylphenol); and mixtures thereof;

(d) a small but effective amount within the range of from greater than 0.03 but less than 0.09 part by weight per each part by weight of said component (b), and which is sufficient to aid in stabilizing said composition against color degradation, of an organic phosphite selected from the group consisting of dioctyl phosphite, trioctyl phosphite, diethyl phosphite, dibutyl phosphite, diphenyl phosphite, didecyl phosphite, tridecyl phosphite, phenyldidecyl phosphite, phenyldi(hexadecyl) phosphite, diphenyldecyl phosphite, phenyl(nonadecyl) phosphite, and diphenylheptadecyl phosphite, and mixtures thereof;

(e) a small but effective amount within the range of from about 0.03 to about 0.4 part by weight per 100 parts by weight of said polymer, and which is sufficient to aid in stabilizing said composition against color degradation and/or serve as a processing aid in processing said composition, of a metal salt of an organic monocarboxylic acid wherein said metal is selected from the group consisting of zinc, calcium, barium, magnesium, and strontium, and said monocarboxylic acid contains from 12 to 24 carbon atoms; and (f) a small but effective amount within the range of from about 0.01 to about 0.31 part by weight per each part by weight of said component (b), and which is sufficient to stabilize said composition against the deteriorative action of heat and provide color stabilization during processing of said composition, of a trialkyl substituted hindered phenol selected from the group consisting of 2,6-di-t-butyl-p-cresol; 2,6-di-cyclohexyl-p-cresol; 2,6-di-t-amyl-p-cresol; 2,6-di-isopropyl-4-ethylphenol; 2,6-di-t-octyl - 4 - n-propylphenol; 2,6 - di - cyclohexyl - 4 - n-octylphenol; 2-isopropyl-4-methyl-6-t-butylphenol; 2-t-butyl-4-ethyl-6-t-octylphenol; 2-isobutyl-4-ethyl-6-t-hexylphenol; 2-cyclohexyl-4-n-butyl-6-isopropylphenol; and mixtures thereof.

2. A composition according to claim 1 wherein: said polymer is a polymer of propylene; and said composition is a filamentary composition.

3. A composition according to claim 1 wherein:

said Component (b) is [2,2′-thiobis(4-t-octylphenolato)]-n-butylamine Nickel II, said Component (c) is octadecyl 3-(3,5-di-t-butyl-4-hydroxyphenyl) propionate;

said Component (d) is dioctyl phosphite;

said Component (e) is calcium stearate; and said Component (f) is 2,6-di-t-butyl-p-cresol.

4. A composition according to claim 3 wherein said component (a) is polypropylene.

5. A composition according to claim 3 wherein:

said Component (a) is polypropylene;

said Component (b) is present in an amount within the range of from about 0.7 to about 2 parts by weight per 100 parts by weight of said polymer;

said Component (c) is present in an amount within the range of from about 0.01 to about 0.07 part by weight per 100 parts by weight of said polymer;

said Component (d) is present in an amount within the range of from about 0.04 to about 0.08 part by weight per each part by weight of said Component (b);

said Component (e) is present in an amount within the range of from about 0.07 to about 0.15 part by weight per 100 parts by weight of said polymer; and said Component (f ) is present in an amount within the range of from about 0.02 to about 0.13 part by weight per each part by weight of said component (b).

6. A composition according to claim 5 wherein:

said Component (b) is present in an amount of about 1.6 parts by weight per 100 parts by weight of said polymer;

said Component (c) is present in an amount of about 0.02 part by weight per 100 parts by weight of said polymer;

said Component (d) is present in an amount of about 0.06 part by weight per each part by weight of said Component (b);

said Component (e) is present in an amount of about 0.1 part by weight per 100 parts by weight of said polymer; and said Component (f) is present in an amount of about 0.03 part by weight per each part by weight of said Component (b).

7. A composition according to claim 2 wherein:

said Component (b) is [2,2′-thiobis(-t-octylphenolato)]-n-butylamine Nickel II;

said Component (c) is octadecyl 3-(3,5-di-t-butyl-4-hydroxyphenyl) propionate;

said Component (d) is dioctyl phosphite;

said Component (e) is calcium stearate; and said Component (f) is 2,6-di-t-butyl-p-cresol.

8. A composition according to claim 7 wherein:

said Component (a) is polypropylene;

said Component (b) is present in an amount within the range of from about 0.7 to about 2 parts by weight per 100 parts by weight of said polymer;

said Component (c) is present in an amount within the range of from about 0.01 to about 0.07 part by weight per 100 parts by weight of said polymer;

said Component (d) is present in an amount within the range of from about 0.04 to about 0.08 part by weight per each part by weight of said Component (b);

said Component (e) is present in an amount within the range of from about 0.07 to about 0.15 part by weight per 100 parts by weight of said polymer; and said Component (f) is present in an amount within the range of from about 0.02 to about 0.13 part by weight per each part by weight of said Component (b).

9. A composition according to claim 8 wherein:

said Component (b) is present in an amount of about 1.6 parts by weight per 100 parts by weight of said polymer;

said Component (c) is present in an amount of about 0.02 part by weight per 100 parts by weight of said polymer;

said Component (d) is present in an amount of about 0.06 part by weight per each part by weight of said Component (b);

said Component (e) is present in an amount of about 0.1 part by weight per 100 parts by weight of said polymer; and said Component (f) is present in an amount of about 0.03 part by weight per each part by weight of said Component (b).

References Cited

UNITED STATES PATENTS

| | | | |
|---|---|---|---|
| 3,285,855 | 11/1966 | Dexter et al. | 260—45.85 |
| 3,379,680 | 4/1968 | O'Konski | 260—45.75 |
| 3,255,136 | 6/1966 | Hecker | 260—23 |
| 3,149,093 | 9/1964 | Hecker | 260—45.75 |

DONALD E. CZAJA, Primary Examiner

V. P. HOKE, Assistant Examiner

U.S. Cl. X.R.

260—23 H, 45.7 P, 45.85 B, 45.95 H, 45.95 C, 45.95 R

UNITED STATES PATENT OFFICE

CERTIFICATE OF CORRECTION

Patent No. 3,793,290 Dated February 19, 1974

Inventor(s) James S. Dix et al.

It is certified that error appears in the above-identified patent and that said Letters Patent are hereby corrected as shown below:

Column 7, line 60, claim 1, change "phenyl(nonadecyl) phosphite" to -- phenyldi(nonadecyl) phosphite --; column 8, line 16, claim 3, after "claim" change "1" to -- 2 --. column 8, line 60, claim 7, change "[2,2'-thiobis(-t-octylphenola-" to -- [2,2'-thiobis(4-t-octylphenola- --.

Signed and sealed this 15th day of October 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
U.S. GOVERNMENT PRINTING OFFICE 869-930